MAGNETIC TAPE TRANSPORT SYSTEM

Filed March 26, 1963 3 Sheets-Sheet 1

INVENTORS
ROBERT A. KLEIST
BEN C. WANG

BY Robert G. Clay

ATTORNEY

*INVENTORS*
ROBERT A. KLEIST
BEN C. WANG

*BY* Robert G. Clay

*ATTORNEY*

MAGNETIC TAPE TRANSPORT SYSTEM

Filed March 26, 1963 3 Sheets-Sheet 3

*INVENTORS*
ROBERT A. KLEIST
BEN C. WANG

*BY* Robert G. Clay

*ATTORNEY*

United States Patent Office 3,251,563
Patented May 17, 1966

3,251,563
MAGNETIC TAPE TRANSPORT SYSTEM

Robert A. Kleist, Woodland Hills, and Ben C. Wang, Los Angeles, Calif., assignors to Ampex Corporation, Redwood City, Calif., a corporation of California Filed Mar. 26, 1963, Ser. No. 268,140
15 Claims. (Cl. 242—55.12)

This invention relates to systems for transporting web material, and particularly to systems for providing bidirectional, intermittent movement of a magnetic tape.

Magnetic tape transport systems represent merely partial examples of the many modern systems in which a web material must be advanced in a controlled fashion at a high rate of speed. Magnetic tape systems, however, require much closer mechanical control than most dynamic mechanisms because of the density with which data is recorded on the tape and the speed at which the tape is moved. Because high bit densities are needed for most digital records and extremely wide bandwidths are often used for analog recordings, minute displacements of the tape from the true path can result in loss or distortion of reproduced signals. Similar considerations apply to comparable forms of recordings, such as those using electrostatic or thermoplastic tapes. Magnetic tape systems are in much wider use than comparable recording systems, however, and accordingly the invention will principally be discussed as applied to magnetic tape systems, although it will be understood to be applicable generally to systems for moving web materials.

Most currently available high performance tape transport machines incorporate relatively complex mechanical and electrical means in order to simultaneously meet different requirements. While the tape must be moved at extremely high speeds, such as 75 to 150 inches per second, it must also be handled gently to avoid breakage, tape stretching and wear of the magnetic oxide surface. At the same time, the tape must also be guided in a precise path past the magnetic head assembly. The problem of achieving high speed movement with gentle handling and precise guiding becomes most complex in a digital tape transport, which is required to operate intermittently and bidirectionally. With such systems, the tape must usually be started or stopped in a very brief time interval and over a very short distance in order to effect data transfer in accordance with the needs of the associated data processing system.

Modern magnetic tape transport systems therefore usually employ low inertia tape buffer mechanisms which operate in conjunction with reel servo systems and contra-rotating drive capstans. Associated pinch roller devices are pulsed to engage and disengage the tape at high speed with respect to the capstans, in accordance with the starting and stopping sequence which is needed. The low inertia tape buffer mechanisms often take the form of vacuum chambers in which intermediate lengths of tape are looped between a capstan and the adjacent reel. As the tape is rapidly started and stopped the relatively slow action of the high inertia reel motor and reel may be compensated for by appropriate changes in loop length within the adjacent vacuum chamber. The tape buffer mechanism between the reel and the capstan mechanism also insures that only relatively short length, very low weight, sections of magnetic tape need be accelerated and decelerated by the capstan drive mechanism. By these techniques, start-stop times are reduced to the order of milliseconds, and bidirectional arbitrarily programmed operation becomes feasible.

As is understood by those skilled in the art, problems of tape wear, tape guiding and tape failure can be critical with such systems. Pinch roller and capstan mechanisms do not provide gentle tape handling, for example, because such mechanisms inherently impose high friction and high impulsive forces on the tape. The magnetic surface is therefore subjected to a wearing action. Slight misalignments in the capstan-pinch roller assembly introduce undesirable skew effects in the tape motion. Further, if both pinch roller actuators are inadvertently operated at the same time, the result is almost inevitably a tape break. If the tape becomes caught against one of the guiding or other elements, or control of the tape is lost, such tape failure is also likely to occur. Usually, much of the tape starting and stopping intervals are taken up by actuator dead time. Following the dead time, however, the impulse given the tape is considerably more severe and abrupt than it need be if the entire start or stop interval can be effectively employed.

A number of techniques have been adopted for minimizing the forces acting on a tape while permitting high speed transport and rapid start-stop characteristics. These techniques usually utilize vacuum or pneumatic guiding and capstan elements and low friction tape path configurations. Gentler tape handling does result but at a sacrifice in the control of start-stop characteristics or at a considerable increase in the complexity and cost of the equipment. For ease in programming and data transfer, standardized interrecord gap distances have been adopted and must be adhered to by tape transports. The complex prior art systems provide different start-stop distances in accordance with system wear, program conditions and environmental and tape conditions.

It is therefore an object of the present invention to provide an improved magnetic tape transport mechanism.

Another object of the present invention is to provide an improved mechanism for moving web material in particularly simple and economical fashion but at high speed and with precise control.

Another object of the present invention is to provide an improved digital magnetic tape transport having bidirectional and intermittently controllable operation with substantial freedom from high forces acting on the tape but with precise control of start-stop characteristics and distances.

Another object of the present invention is to provide an extremely simple high performance tape transport system.

These and other objects of the present invention are met by a combination of means providing a low friction, tape path and a single bidirectional driven capstan which is itself started and stopped. The tape path provides a high wrap angle of tape about the capstan, such that a high starting frictional resistance is presented and the tape does not slide relative to the capstan even though held under only light tension about the capstan. The tape moves along a low friction path between associated low inertia compliance mechanisms and is thereby controlled solely by the capstan. This arrangement is such that the tape moves with the capstan and may be started, driven in either direction and stopped with controlled characteristics solely by electrical control of the capstan drive. The tape path and the low friction and low tension combine to afford exceptional stability in movement even though there is a minimum of tape and mechanism wear and small likelihood of catastrophic failure.

In a specific arrangement in accordance with the invention, a tape transport system of exceptional simplicity for digital applications is provided through the use of a pair of constant cross-section vacuum chambers, one on each side of a single drive capstan about which the tape is looped with a large wrap angle. The capstan preferably has a high friction, slightly resilient surface in engagement with the tape. Only low friction guiding elements are employed in this configuration, the tension along the tape in the vicinity of the capstan being kept above that at which the tape will slide on the capstan during start and stop movements but below the level at which a substantial loading is exerted on the capstan. The capstan is driven directly from a motor having a low armature inertia and high torque to inertia ratio and electrically controlled to have selected start and stop characteristics. The low inertia and forces present in the mechanical system permit the tape acceleration and deceleration to be controlled solely by the signals applied to the motor. Because the signals are precise and uniform, and readily modified to have special characteristics, start and stop distances are essentially unvariant, so that the tape transport system is operable with standard interrecord gap formats.

In such systems, the tape path can be arranged so that the oxide surface of the tape does not have sliding contact except at the magnetic head assembly, so that tape wear is minimized. The complete absence of high friction and pressure forces also assist in the minimization of tape wear, and provide a further significant advantage in that the tape may actually be mechanically constrained without danger of breakage. Nevertheless, the tape movement is highly stabilized because the tape path forms a succession of loops by which lateral forces are effectively decoupled. High peak tensions in the tape may now be completely avoided simply by use of electrical signal control of the motor. At the same time, the direct use of signal control of tape movement eliminates actuator dead time.

A better understanding of the invention may be had by reference to the following description, taken in conjunction with the accompanying drawings, in which.

Figure 1:
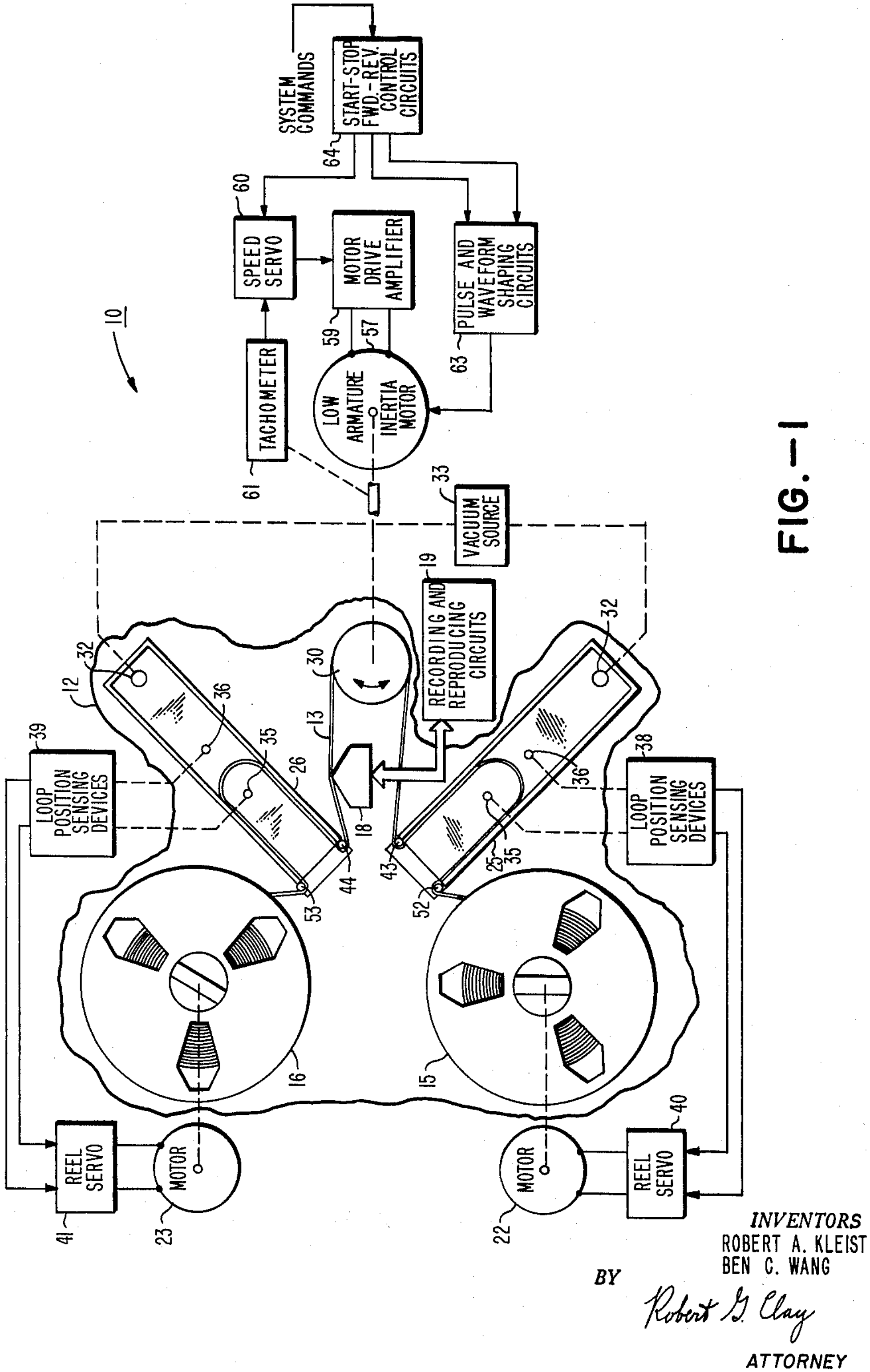
FIGURE 1 is a simplified front view of a tape transport and a block diagram representation of associated elements in a tape transport system in accordance with the present invention.
Figure 2:
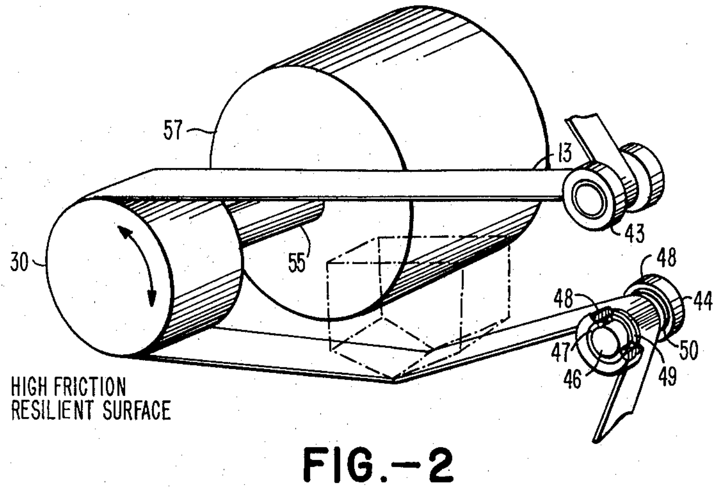
FIGURE 2 is a partial perspective view of a portion of the arrangement of FIGURE 1 showing the capstan, capstan motor, and associated guide elements.

Referring now to FIGURES 1 and 2, all of the principal elements of a tape transport 10 in accordance with the invention are shown, although associated elements non-essential to the present invention have been omitted in order to simplify the representation, inasmuch as their use will be understood.

The principal operative elements of the tape transport are mounted on a front panel 12, shown only in generalized form. The tape 13 is moved in either direction along a controlled path between a supply reel 15 and a takeup reel 16 past a magnetic head assembly 18 which is coupled to recording and reproducing circuits 19. Separate drive motors 22, 23 for the supply and takeup reels 15, 16 are coupled directly to the reels behind the panel 12, but are shown as physically displaced for clarity.

Between the two reels 15, 16 the tape path is defined by a pair of low inertia differential pressure devices, such as vacuum chambers 25, 26, and a single, centrally positioned, drive capstan 30. For bidirectional operation the chambers 25, 26 and the capstan 30 are symmetrically placed relative to the reels 15, 16. The tape path thus defines a succession of adjacent close coupled loops.

Each of the vacuum chambers 25, 26 is of substantially constant cross-section and includes a terminating vacuum inlet port 32 coupled to a vacuum source 33, and also includes a pair of loop sensing positions 35, 36 for detecting different tape loop lengths within the chamber. Any of a number of conventional differential pressure sensing devices 38, 39 may be coupled to the sensing positions 35, 36 to detect changes in the pressure thereat caused by the presence of the tape 13 so as to indicate the position of the tape loop in the vacuum chamber 25 or 26. Photoelectric or other sensors may also be used to detect loop length. Output signals from the loop position sensing devices 38, 39 are coupled to reel servos 40, 41 to control the separate reel motors 22, 23 respectively. In accordance with standard servo techniques for magnetic tape transports, the servos may use proportional control or the noncontinuous type of control which is shown. The servos may also include selectively operable braking means (not shown) for stopping the reels rapidly so as to insure positive control. Various other similar expedients will be understood to be available to those skilled in the art, and accordingly have not been described in detail.

It is preferred to employ a capstan 30 which has a highly frictional surface which may be slightly resilient such as a rubber or rubber covered element. The capstan should be substantially undeformed by the tape at the tensions which are employed, however. At the entry ends of the chambers 25, 26 here defined as the sides closest the capstan 30, the tape 13 passes over low friction guide rollers 43, 44 (best seen in FIGURE 2). As shown by the cutaway portion of the guide roller 44 each guide roller includes a central pin 46 rotatably mounted in ball bearings 47 journaled in end retainers 48. The central pin 46 includes spaced annular flanges 49, 50 for restricting lateral movement of the tape 13. At the exit side of each vacuum chamber 25, 26 the tape 13 passes over similar low friction guide rollers 52, 53 as used at the chamber entry, although fixed, smooth guide posts could be used. The capstan 30 is mounted on a motor shaft 55 and directly driven by a bidirectional motor 57.

Various alternatives may be employed but are not preferred for the low cost system of FIGURES 1 and 2. The capstan may be of steel, for example, and the tape may be held against it by idlers under light pressure. A pneumatic or vacuum capstan may also be employed. The slightly resilient rubber or rubber-like surface is preferred, however, because it provides an economical frictional surface and there is more than a proportional increase in starting friction as the tape tension is increased. Other arrangements of guides are discussed below in conjunction with other figures.

The mechanism thus far defined constitutes the mechanical part of a transport system for providing bidirectional and intermittent control of magnetic tape with predictable control of start-stop characteristics. The simplicity of the mechanism should not obscure the fact that it constitutes a marked departure from the systems of the prior art. The vacuum chambers 25, 26 and roller guides 43, 44 provide a low friction system which maintains the tape 13 under uniform tension in the vicinity of the single drive capstan 30. By uniform tension is meant that the difference in the tensions between the two vacuum chambers is consistently low. Uniform tension is achieved in the present system by using chambers of constant cross-section which are closely coupled. Close pneumatic coupling may be achieved by using a relatively large vacuum source and low pneumatic impedance couplings to the vacuum ports if desired. Accordingly, the tape tensions generated because of the differential pressures in the two chambers are initially of substantially equal amplitude and remain substantially equal during operation.

With this arrangement there is only minimal engagement of the tape 13 with fixed elements, and there is no sliding contact whatever between the tape 13 and the roller guides 43, 44 or 52, 53 at the ends of the vacuum chambers 25, 26 and the single drive capstan 30.

The capstan 30 is of relatively large size, such as a 2.076 inch diameter for 36 i.p.s. tape movement in one practical embodiment. A large but light weight capstan reduces the tape stresses involved without introducing high inertia. The tape path defines a relatively large wrap-around angle on the capstan 30, preferably of approximately 180°, so that the large surface area of the capstan and the large wrap-around angle provide a large surface contact area between the tape 13 and the capstan 30 so that the capstan exerts a uniform driving force across the tape under all operating conditions without the necessity of adjustable components. With a highly frictional capstan 30, only a low tension (e.g. 0.2 lb.) on the tape 13 is needed to prevent sliding of the tape 13 relative to the capstan 30. The tension is sufficiently high, relative to the starting friction, to avoid sliding movement but not so high as to introduce a significant loading into the system.

The wrap-around angle of the tape on the capstan and the frictional properties of the tape and capstan determine the total starting force needed to cause the tape to slip relative to the capstan. With a low difference between the tensions of the two chambers, as here, there is no tendency of the tape to slip relative to the capstan, and only very small driving forces are needed for the capstan. The driving forces need only overcome the tape inertia, the low friction guide inertia, and the friction over the head assembly (air bearing heads may also be used). The tape tensions may therefore be chosen to be relatively high, as long as their difference remains low, but it is preferred to use relatively low tensions, adequate to draw the tape into a chamber during start. It is found that the capstan and motor inertia are usually an order of magnitude greater than the sum of the tape and guide inertias, the various frictions, and the low tension differences, which must be overcome. Thus although the tape is positively driven by the capstan it introduces no loading to the capstan or motor systems.

This is a most significant departure from the prior art. Prior art systems have usually employed high pressure or high impact forces, such as those exerted by pinch rollers and pneumatic systems, to urge the tape against the capstan. With pinch roller mechanisms, the variations (such as dynamic skew) in tape movement are caused largely by dimensional variations in the pinch rollers and capstans, dimensional variations in the width and thickness of the tape, and non-uniform pressures resulting from slight pinch roller wear and misalignments.

The present system completely avoids these difficulties of prior art systems, however, by the use of a single capstan in combination with a low friction tape path having uniform tensions. Note also that in the passage along the tape path between the two reels the tape effectively forms a succession of loops. In the absence of high pressure and tension forces and high impact forces and with the decoupling of skew effects through the use of low tension loops, the tape moves along its desired path with a high degree of stability determined principally by the tape width tolerance and chamber entry guide tolerances. The region of greatest interest is of course the region in the vicinity of the magnetic head assembly 18. Here, tape movement is substantially independently controlled solely by the capstan 30 and the two roller guides 43, 44 having flanged surfaces 49, 50 at the entry ends of the vacuum chambers 25, 26. Once these elements are precisely dimensioned and positioned, it is found that as a practical matter the dimensional variations of the tape are the principal contributors to dynamic skew.

Note also that the oxide surface of the tape 13 is so looped as to engage only the magnetic head assembly 18. Contact with the sides of the chambers 25, 26 therefore does not result in buildup of an oxide coating or wear of the tape. However, the tape may also be reversed so that the oxide runs against the chamber, or a conductive coating may be placed on the non-oxide surface, if desired to reduce static charges or for other reasons.

The low friction, constant tension operation of this system is further advantageously utilized in a direct cooperative relationship with the driving system, which includes electrical means for controlling the response of the motor 57. It is preferred to employ a low armature inertia motor 57, such as the commercially available type utilizing a planar or disk-type rotor having printed circuit conductor elements thereon. This type of motor has a high torque per unit current, relatively low armature inertia, and a torque constant which is maintained to exceedingly high currents. Thus the motor 57 has high acceleration for relatively low motor currents, and requires only a relatively low voltage. Other similarly high torque to inertia ratio motors such as "D.C. torques" may be used over their range of linear torque constant.

The motor drive amplifier circuits 59 and a speed servo 60 operating off a tachometer 61 coupled to the capstan 30 have not been shown in detail, inasmuch as they may be conventional. The motor may be operated in response to either or both of two different signals, one of which is derived from the speed servo 60 when the tape is running at substantially constant speed. The other signal is derived from pulse and waveform shaping circuits 63 which generate the signals needed for system mode changes in response to commands derived from external sources. The pulse circuit 63 are actuated from control circuits 64 which convert the commands to energizing pulses of appropriate polarity. At any selected tape speed, the speed servo 60 operating in response to the tachometer 61 output, controls the motor 57 and therefore taped speed through control of the motor drive amplifier 59. The pulse and waveform shaping circuits 63, on the other hand, respond to an input command so as to provide a specific signal waveform for momentary energization of the motor 57. By the application of controlled start or stop current waveform to the motor 57, the system may be given any desired acceleration and deceleration characteristics. Further, these characteristics, being electrically controlled, are fully adjusted and predictable.

A more detailed description of circuits for controlling a single drive capstan system in accordance with the invention is provided in an application for patent of Robert A. Kleist, entitled "Drive System for Tape Transport Systems," Serial No. 267,175, now Patent No. 3,185,364, and assigned to the assignee of the present invention and filed concurrently herewith.

In the simplest example, constant acceleration and deceleration of the tape are selected, so that speed increases linearly immediately upon application of the start command, reaches the desired nominal velocity in a predetermined time interval. At the termination of this interval the speed servo 60 exercises control. Because tape acceleration is constant and distributed over the full start time, and because the tape is moved on a low friction path, the tape appears as a rigid body and moves under a complete control of the capstan. Tape stretch and abrupt velocity transients are both completely eliminated. The system accordingly does not introduce a speed overshoot and therefore quickly brings the tape velocity within controlled limits as to instantaneous speed variation. Deceleration in uniform fashion is achieved in like manner simply by impulsing the motor with a pulse of appropriate energy, polarity and current waveform.

This method of control of the tape movement by electronic means has many advantages, derived from the cooperative relationship of the drive circuits and the low friction, low tension tape transport. With pinch roller actuators or pneumatic drives, for example, there is a "dead" time between the time of application of an input command and the time of effective engagement of the tape to the capstan. During this "dead" time no control of the tape movement is being exercised, whereas in the present system the input command immediately energizes the motor and substantially immediately commences acceleration or deceleration of the tape. Again in contrast to the pinch roller device, in which there is a very sudden acceleration of the tape upon impact of the pinch roller against the capstan, the acceleration (in the present example) remains constant, resulting a smooth and gentle tape movement even though the final tape speed reached may be relatively high. Electrical control of the start-stop characteristics is closely related to the mechanical aspects of the tape transport system, because both aspects are used in cooperation to avoid the introduction of forces which introduce irregularities in start-stop times and distances. The controlled acceleration and deceleration also permit full reliance on uniform start-stop distances, and insure that the tape transport systems in accordance with the present invention operate compatibility with the inter-record gaps provided in standard magnetic tape data formats. Note that the control circuits 64 may be coupled to enable speed servo 60 once the acceleration interval has transpired and to disable the speed servo at the initiation of the deceleration interval.

Only any particular machine, nominal velocity may be made selectable at any of a number of tape speeds, including a high rate search speed. The start-stop circuits may be made variable to control acceleration and deceleration between the different speeds, or additional pulse circuits may be employed.

The configuration of the vacuum chambers relative to the single capstan and the reels are shown in FIGURE 1 is extremely compact, so that the entire structure may be mounted in a standard 19 inch rack. This in turn enables the tape transport mechanism to be mounted in various multiple configurations, such as two by two and one by four. Note, however, that systems for other applications are described below which provide different combinations of size, complexity and performance.

Figure 3:
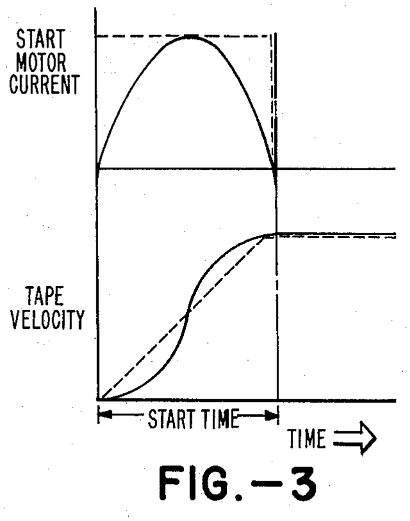
FIGURE 3 is a graph of various motor current and tape velocity characteristics with time, illustrative of the operation of systems in accordance with the invention.

FIGURE 3 illustrates graphically how selected current waveforms are applied for starting and stopping the motor 57 with control of tape acceleration and deceleration. In FIGURE 3, the start motor currents and tape velocity are plotted against time for two different start current waveform characteristics, illustrated in solid and dotted lines respectively. The start current acts to overcome motor and tape system inertia whereas the speed control signal need only overcome brush and other friction, and is not shown being typically 10 to 1 less than peak start currents. As illustrated by the solid line curve in the upper portion of FIGURES 3, a half sine wave may selectively be used as the start motor current. With a motor having an acceleration characteristic which is proportional to input current, the tape acceleration reaches a peak coincident with the peak of the sine wave pulse. The tape velocity thereafter increases but with decreasing acceleration until the sine pulse terminates, at which point the speed servo controls. This arrangement has particular advantages because it is relatively easy to generate a sine pulse as the starting waveform, and a like pulse of opposite polarity as the stopping pulse. Thus, the tape will be smoothly brought to speed or stopped.

It is also conventional and economical to generate a constant current pulse (dotted line waveform) of selected duration, so as to provide a constant acceleration, even though the total start time may be the same in arriving at a desired nominal velocity. Here again, the entire start (or stop) interval is utilized, and the start (or stop) times and distances are repeatable and controlled.

Figure 4:
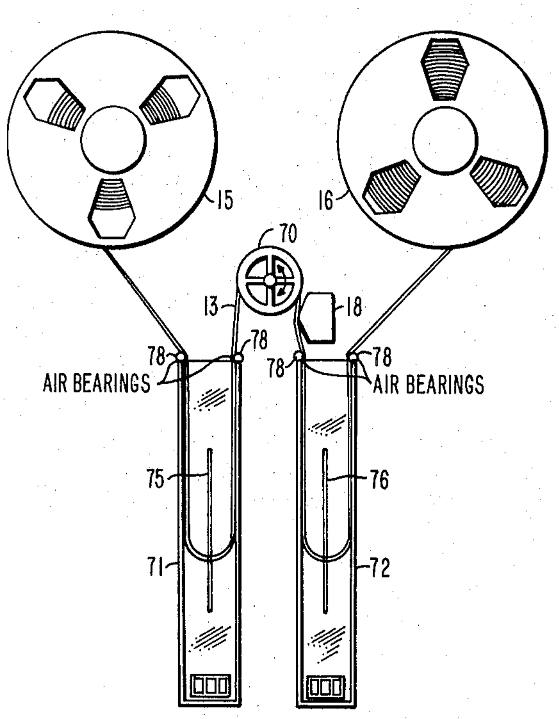
FIGURE 4 is a simplified front view of another configuration of tape transport in accordance with the invention.
Figure 5:
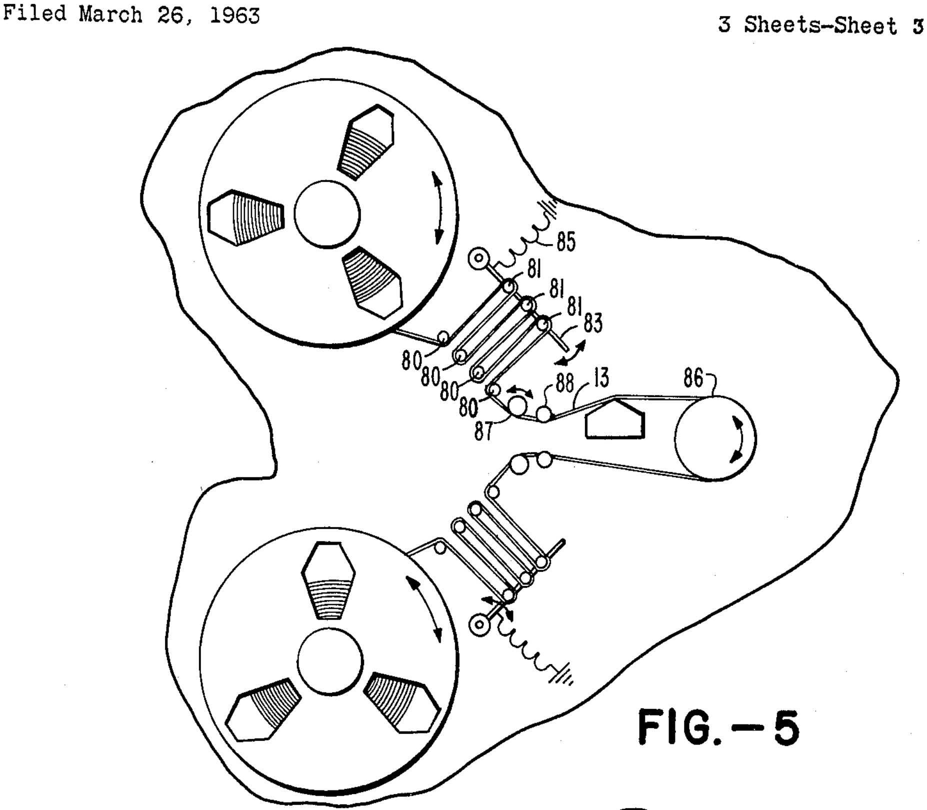
FIGURE 5 is a simplified front view of yet another form of tape transport in accordance with the invention.
Figure 6:
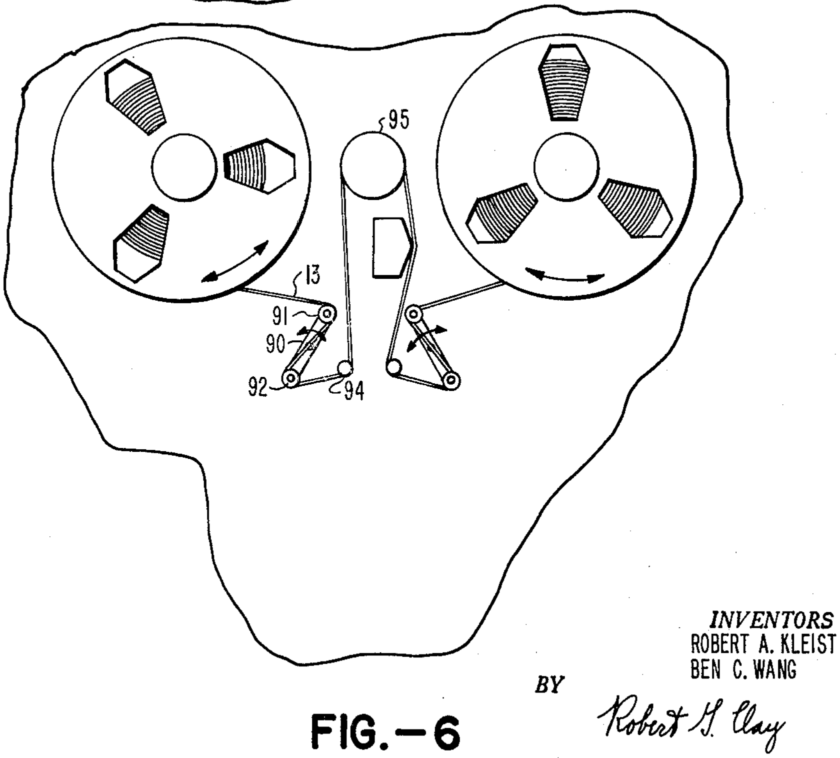
FIGURE 6 is a simplified front view of yet another configuration of tape transport system in accordance with the invention.

Other configurations of low friction, low tension tape paths using a single drive capstan may be employed in accordance with the invention, as shown in FIGURES 4, 5 and 6. A high performance transport is illustrated in only general form in FIGURE 4, the frictional inertial forces being minimized in this arrangement to permit faster start-stop times and higher tape speeds. For example, the single drive capstan 70 is of a thin shell type, so that it may be accelerated and decelerated more readily. The angles at which the tape 13 enters and leaves the vacuum chambers 71, 72 are minimized by parallel placement of the entry ends of the chambers relative to the capstan 70 and by placement of the vacuum ports close together to allow closer coupling of the chambers themselves. The tape path nevertheless forms three adjacent loops in the tape 13. With the high performance transport, vacuum chambers 71, 72 of longer length are desired and proportional servo control may be achieved such as by the use of loop sensing slots 75, 76 along part of the length of each chamber 71, 72 respectively to control the reel servos (not shown). This friction may be further reduced by the use of air bearing guides 78 at the exit and entry portions of each of the vacuum chambers 71, 72. The oxide side of the tape 13 does not contact either the walls of the chambers 71, 72 or the surface of the capstan 70 and is not in sliding contact with any element but the magnetic head assembly 18.

Low friction and adequately low tension arrangements in accordance with the invention may also be derived by the use of other buffer mechanisms, as shown in FIGURES 5 and 6. In FIGURE 5, the compliance means is a multiple loop tension arm arrangement in which the tape 13 is looped successively between fixed roller guides 80 and movable roller guides 81. The movable rollers 81 are mounted on a movable tension arm 83 which is mechanically biased by a light spring 85 to provide the desired intermediate buffer storage. This arrangement also uses a different form of low friction guiding mechanism in the vicinity of the single drive capstan 86. The guide mechanism includes a low friction roller guide 87 and a fixed post guide 88 having a flanged shoulder for control of the lateral position of the tape.

The mechanism of FIGURE 6 is particularly compact and economical. Here a variable length, low friction loop in the tape 13 is provided by a centrally pivoted arm 90 having roller guides 91, 92 at each end. The tape 13 is wrapped oppositely about the guides 91, 92 and over a roller guide 94 adjacent the capstan 95. Appropriate movement of the buffer arm 90 compensates for speed variations between the capstan and the tape reel, which is controlled in conventional fashion by a servo (not shown).

While there have been described above and illustrated in the drawings various forms of tape transport systems in accordance with the invention, it will be appreciated that a number of other modifications and alternative arrangements are possible. Accordingly, the invention should be considered to include all modifications, variations and alternative forms falling within the scope of the appended claims.

What is claimed is:

1. Web transport means for moving a web member at high speed in a bidirectional program comprising web supply and takeup means, a pair of loop forming means positioned between the web supply and takeup means, and spaced apart along the path of the web, each of the loop forming means introducing and maintaining a substantially like tension in the web, the tension being substantially independent of loop length, a bidirectional drive member positioned intermediate the pair of loop forming means, the drive member being in constant contact with the web, means for energizing said drive member to rotate in a selected direction, and low friction means for guiding the web between the drive member and each of the loop forming means, the low friction means being disposed to increase the angle of wrap of the web member about the drive member, and providing lateral restraint of the web.

2. A high speed, intermittent and bidirectional movement transport system for web material comprising supply and takeup reel means, a web member mounted to move between the supply and takeup reel means, a pair of buffer mechanisms for the web material, each disposed adjacent a different one of the reel means along the web path, the buffer mechanisms providing substantially equal tension, a single drive capstan positioned between the buffer mechanisms and in continual engagement with the web, the web being wrapped around the drive capstan with at least an approximately 180° angle, low friction means disposed along the web path and providing a substantially symmetrical path for the web about the capstan, the low friction means further providing lateral restraint of the web, motor means continuously directly coupled to drive the capstan, and means for energizing the motor means to accelerate the web throughout a start-stop interval initiated by a control signal.

3. A magnetic tape transport system for providing intermittent bidirectional movement of a magnetic tape including supply and take-up means for the tape, a pair of low inertia tape length storage means disposed symmetrically between the supply and takeup means, means including the storage means for confining the tape in a low friction path, rotatable drive means positioned symmetrically between the storage means in continuous contact with the magnetic tape, the rotatable drive means having a slightly resilient highly frictional surface and being positioned to provide a substantial loop in the tape between the storage means, means for energizing said rotatable drive means in a selected direction, and low friction guide means disposed between the tape length storage means and the rotatable drive means, and positioned to increase the wrap angle of the tape about the drive means.

4. The device of claim 2 wherein said loop forming means comprises web length storage means providing substantially equal tensions in the web, and further including reel servo means responsive to the length of web loop in the separate storage means and controlling the supply and takeup means, and magnetic head means disposed along the intermediate loop between one of the storage means and the drive member, such that the driving force provided by the member is substantially only that needed to overcome web inertia, the inertia of the low friction means, and sliding friction at the magnetic head assembly, the tension in the storage means being sufficient to withdraw the web when it is directed in the direction of the particular storage means.

5. A magnetic tape transport mechanism for digital operation comprising a single drive capstan, the tape being wrapped about the capstan in a central loop and in continuous engagement therewith, a pair of low friction tape tensioning means, each positioned on an opposite side of the capstan along the central loop and each providing substantially like tension during operation, the tension being adequate for drawing the tape uniformly from the capstan when the tape is accelerated in the direction of the particular tape tensioning means, motive means continuously directly coupled to drive the capstan bidirectionally, means for energizing the motive means to accelerate the tape through a start-stop interval initiated by a control signal, and low friction tape guide means positioned between the capstan and the pair of tape tensioning means, the inertia of the tape guide means and the tape length between the tensioning means being substantially an order of magnitude smaller than the inertia of the capstan and motive means.

6. A magnetic tape transport mechanism for digital operation comprising a single drive capstan, the tape being wrapped about the capstan in a central loop and being in continuous engagement therewith, a pair of low friction tape tensioning means, each positioned on an opposite side of the capstan along the central loop and each providing substantially like tension during operation, the tension being adequate for drawing the tape uniformly from the capstan when the tape is accelerated in the direction of the particular tape tensioning means, a pair of low friction tape guide rollers, each having a pair of spaced apart shoulders for lateral restraint of the tape, and each positioned between the drive capstan and a different one of the tape tensioning means, the central tape loop being substantially free of other restraints, magnetic head means disposed along the central loop in operative association with the capstan, a motor having a shaft continuously directly coupled to the capstan to drive the capstan bidirectionally, and means for energizing the motor to accelerate the tape throughout a start-stop interval initiated by a control signal, the inertia of the tape guide means and a tape length between the tensioning means, plus siding friction at the magnetic head means, being substantially an order of magnitude smaller than the inertia of the capstan and motive means, such that the capstan is substantially free from loading by the tape system and the driving force of the capstan acts only on the inertia of the tape length in the central loop, the inertia of the low friction guide rollers, and the sliding friction.

7. A tape transport system for bidirectional control of a tape member including a single drive capstan, the capstan having a slightly resilient, highly frictional surface, at least a pair of tape loop buffer means disposed adjacent the capstan, the buffer means being positioned relative to the drive capstan to provide three adjacent loops of the tape, one of the loops being around the capstan, a pair of low friction guide elements, each positioned between the capstan and a different one of the buffer means, the low friction guide elements providing lateral restraint of the tape, bidirectional motive means continuously directly coupled to the capstan, and means for energizing the motive means to accelerate the tape throughout a start-stop interval initiated by a control signal.

8. A magnetic tape transport system for bidirectional control of a magnetic tape member including a single drive capstan in the tape path, the tape being disposed about the single drive capstan with a large wrap around angle and in continuous engagement therewith, the surface of the drive capstan in engagement with the tape having a high coefficient of friction, at least a pair of tape loop buffer means disposed adjacent the capstan, the buffer means being positioned relative to the drive capstan to provide three adjacent loops in the tape path, one of the loops being around the capstan, magnetic head means disposed adjacent the tape loop about the capstan and in operative association with the tape, a pair of low friction guide elements, each positioned between the capstan and a different one of the buffer means and providing lateral restraint of the tape, such that the tape loop about the capstan is maintained in a balanced tension, low friction path and substantially free to move with the capstan, bidirectional electrical motive means continuously directly coupled to the capstan, and means for energizing the motive means to drive the capstan and the tape in a selected program of bidirectional movements.

9. A magnetic tape transport system comprising supply and takeup reel means, a magnetic tape mounted to move between the supply and takeup reel means, a pair of buffer mechanisms, each disposed adjacent a different one of the supply and takeup reel means and each positioned along the tape path and acting on the tape, a drive capstan positioned between the buffer mechanisms and in continual engagement with the tape, the tape being wrapped around the drive capstan with an approximately 180° angle, motor means continuously directly coupled to drive the capstan, means for energizing the motor means to accelerate the tape throughout a start-stop interval initiated by a control signal, the buffer mechanisms maintaining substantially equal and low tensions on the tape in the region of the capstan, the tension being adequate to withdraw the tape during acceleration toward the associated buffer mechanisms, and below that at which substantial loading of the motor means is introduced, and tape guide means disposed between the buffer mechanisms and the drive capstan, the inertia of the tape guide means and the tape length between the buffer mechanisms being at least an order of magnitude smaller than the inertia of the capstan and motive means.

10. A low cost, digital magnetic tape transport comprising a supply reel and a takeup reel, a magnetic tape positioned to extend between the respective reels, a pair of low friction guide means positioned at spaced apart points along the tape path between the respective reels, the low friction guide means providing lateral restraint of the magnetic tape, a single intermittently actuable bidirectionally rotatable drive capstan, the drive capstan having a frictional, slightly resilient surface in constant engagement with the tape and being symmetrically arranged between the guide means, and positioned relative to the guide means such as to provide a substantial wrap of tape about the capstan, a motor continuously directly coupled to said capstan, means for energizing the motor to accelerate the tape throughout a start-stop interval initiated by a control signal, and a pair of buffer means, each disposed between a different guide means and the closest adjacent reel, and each providing a low tension loop in the tape path.

11. A device in accordance with claim 2 wherein said web supply and takeup means comprise a pair of reels, said bidirectional drive member comprises a capstan and motor directly and continuously coupled together, and wherein the pair of loop forming means comprise a pair of vacuum chambers positioned substantially symmetrically between the respective reels, each of the vacuum chambers having substantially constant cross-section and being of like configurations, and further comprising vacuum source means coupled to the vacuum chambers for maintaining substantially constant and equal tensions on the web, a pair of loop position sensing means, each associated with a different one of the vacuum chambers, reel drive means coupled to the supply and takeup reels respectively, the reel drive means being responsive to the loop sensing means for the respective vacuum chambers, the low friction means each positioned adjacent the edge of a different vacuum chamber and along the web path to the web capstan, the low friction means providing lateral restraint of the web in a selected path about the capstan, the web path through the chambers and about the capstan being such that the outside surface of the web is directed inwardly relative to the vacuum chambers, and the web being wound about the capstan in a wrap around angle of in excess of approximately 180°.

12. A rapid starting and stopping driving mechanism for magnetic tape mounted between a pair of reels comprising a pair of compliance means, each positioned adjacent a different reel, and each providing a low tension, variable length loop in the tape, a single rotatable drive capstan positioned between the compliance means and in the tape path, the capstan being positioned to provide a large wrap around angle, the engagement of the tape to the capstan being solely frictional, means for intermittently rotating the capstan in either direction comprising an electric motor continuously directly coupled to the capstan and means for energizing the motor to accelerate the tape throughout a start-stop interval initiated by a control signal, and a pair of low friction guiding elements each positioned between the drive capstan and a different one of the compliance means, and each providing lateral restraint only of the tape.

13. A device in accordance with claim 2 wherein the loop forming means comprise a pair of vacuum chambers providing substantially even tension on the web, the vacuum chambers being positioned adjacent and along parallel longitudinal axes, and air bearing guide members positioned at the ends of the vacuum chambers along the web paths, and wherein the bidirectional drive member comprises a single drive capstan continuously directly coupled to an electric motor and symmetrically positioned between the vacuum chambers and spaced apart therefrom, such that the web is looped into each of the chambers and about the single drive capstan with a substantial angle of wrap, the drive capstan being of hollow shell construction.

14. A device in accordance with claim 2 wherein the web member is a magnetic tape and wherein the loop forming means comprise a pair of multiple loop tension arm systems providing substantially even tension on the tape, and a pair of low friction guide means, each positioned along the tape path between the drive member and a different one of the tension arm systems, and each including a roller guide and a fixed post guide providing lateral restraint of the tape.

15. A device in accordance with claim 2 wherein the web member comprises a magnetic tape and wherein the loop forming means comprise a pair of rotatable arm tension systems, each disposed along the tape path adjacent a different one of the supply and takeup means, and each including a centrally rotatable arm and a pair of roller guides at the ends thereof, the tape being threaded to rotate the roller guides in opposite directions, and the two tension systems providing substantially equal tensions in the tape.

References Cited by the Examiner

UNITED STATES PATENTS

| | | | |
|---|---|---|---|
| 2,845,197 | 9/1958 | MacNeill | 242—55.12 |
| 2,873,926 | 2/1959 | Roberts | 242—55.12 |
| 2,904,275 | 9/1959 | Selsted et al. | 242—55.12 |
| 2,989,260 | 6/1961 | Panissidi | 242—55.12 |
| 3,016,207 | 1/1962 | Comstock | 242—55.12 |
| 3,026,634 | 3/1962 | Irazoqui | 242—55.12 X |
| 3,112,473 | 11/1963 | Wicklund et al. | 242—55.12 X |
| 3,137,453 | 6/1964 | Wooldridge | 242—55.12 |

FOREIGN PATENTS

| | | |
|---|---|---|
| 1,133,810 | 11/1956 | France. |

MERVIN STEIN, *Primary Examiner.*

G. F. MAUTZ, *Assistant Examiner.*

UNITED STATES PATENT AND TRADEMARK OFFICE
CERTIFICATE OF CORRECTION

PATENT NO. : 3,251,563

DATED : May 17, 1966

INVENTOR(S) : Robert A. Kleist et al

It is certified that error appears in the above–identified patent and that said Letters Patent are hereby corrected as shown below:

Col. 6, line 32, between "pulse" and "63", "circuit" should read --circuits--; line 38, between "therefore" and "speed", "taped" should read --tape--. Col. 7, line 22, after "operate", "compatibility" should read --compatibly--; line 28, before "any particular", "Only" should read --On--; line 35, between "reels" and "shown", "are" should read --as--. Col. 9, claim 4, line 36, between "of" and "wherein", "claim 2" should read --claim 1--. Col. 10, claim 6, line 16, between "plus" and "friction", "siding" should read --sliding--; line 18, between "and" and ",such" "motive means" should read --motor--. Col. 11, claim 11, line 28, between "with" and "wherein", "claim 2" should read --claim 1--. Col 12, claim 13, line 10, between "with" and "wherein", "claim 2" should read --claim 1--. Col. 12, claim 14, line 24, between "with" and "wherein", "claim 2" should read --claim 1--. Col. 12, claim 15, line 33, between "with" and "wherein", "claim 2" should read --claim 1--.

Signed and Sealed this

*fifteenth* Day of *June 1976*

[SEAL]

*Attest:*

RUTH C. MASON
*Attesting Officer*

C. MARSHALL DANN
*Commissioner of Patents and Trademarks*